(12) United States Patent
Sethi

(10) Patent No.: US 6,704,780 B1
(45) Date of Patent: Mar. 9, 2004

(54) EFFICIENT REPRESENTATION OF SYSTEM NETWORK MANAGEMENT OBJECT IDENTIFIERS

(75) Inventor: Aseem Sethi, Bangalore (IN)

(73) Assignee: Cisco Technology, San Jose, CA (US)

(*) Notice: Subject to any disclaimer, the term of this patent is extended or adjusted under 35 U.S.C. 154(b) by 0 days.

(21) Appl. No.: 09/469,714

(22) Filed: Dec. 21, 1999

(51) Int. Cl.[7] .................. G06F 15/173; G06F 15/16; G06F 7/00; G06F 17/00
(52) U.S. Cl. .................. 709/223; 709/224; 709/247; 707/101
(58) Field of Search .................. 709/223, 224, 709/247, 245; 707/101, 102

(56) References Cited

U.S. PATENT DOCUMENTS

| | | | | |
|---|---|---|---|---|
| 5,509,123 A | * | 4/1996 | Dobbins et al. | 709/243 |
| 5,559,958 A | * | 9/1996 | Farrand et al. | 714/27 |
| 5,778,183 A | * | 7/1998 | Filion et al. | 709/223 |
| 5,802,309 A | * | 9/1998 | Cook et al. | 709/232 |
| 5,923,850 A | | 7/1999 | Barroux | 395/200.54 |
| 5,991,806 A | * | 11/1999 | McHann, Jr. | 709/224 |
| 6,085,243 A | * | 7/2000 | Fletcher et al. | 709/224 |
| 6,148,337 A | * | 11/2000 | Estberg et al. | 709/224 |
| 6,176,883 B1 | * | 1/2001 | Holloway et al. | 709/223 |
| 6,243,748 B1 | * | 6/2001 | Arai | 709/223 |
| 6,308,174 B1 | * | 10/2001 | Hayball et al. | 707/10 |

OTHER PUBLICATIONS

RFC 1155, "Structure and Identification of Management Information for TCP/IP–based Internets"; Internet Engineering Task Force, May 1990.*
RFC 1212, "Concise MIB Definitions"; Internet Engineering Task Force, Mar. 1991.
RFC 1213, "Management Information Base for Network Management of TCP/IP–based Internets: MIB–II"; Internet Engineering Task Force, Mar. 1991.
RFC 2572, "Message Processing and Dispatching for the Simple Network Management Protocol"; Apr. 1999.
RFC 1157, "A Simple Network Management Protocol (SNMP)"; Internet Engineering Task Force, May 1990.

* cited by examiner

Primary Examiner—Rupal Dharia
Assistant Examiner—Melvin H. Pollack
(74) Attorney, Agent, or Firm—Ritter, Lang & Kaplan (57) ABSTRACT

Systems and methods for efficient storage of network management object identifiers are provided. Object identifiers such as SNMP MIB object identifiers are stored in a compressed form. In one embodiment, a single integer represents multiple elements of an object identifier where these elements are common to many identifiers. The redundancy inherent in a standard object identifier format is thereby greatly reduced. Large memory savings are provided in network management systems that employ many network management objects.

13 Claims, 8 Drawing Sheets

EFFICIENT REPRESENTATION OF SYSTEM NETWORK MANAGEMENT OBJECT IDENTIFIERS

BACKGROUND OF THE INVENTION

The present invention relates to storage of network management information and more particularly to efficient representations of network management information object identifiers.

It is desirable to manage and control nodes of a network such as a TCP/IP network from one or more network management stations connected to the network. The network management stations then monitor and control other nodes in the network including hosts, routers, etc. A protocol known as the Simple Network Management Protocol (SNMP) is used to communicate management information between network management stations and management agent software operating on other network nodes. SNMP is described in Case, RFC 1157, "A Simple Network Management Protocol (SNMP), (Internet Engineering Task Force May 1990), the contents of which are herein incorporated by reference. Using SNMP in a TCP/IP network, a network management station may monitor traffic at a remote node, modify network operation parameters at the remote node, etc.

To facilitate SNMP operation, nodes of a TCP/IP network including the network management stations maintain network management information databases known as MIBs (management information bases). MIBs are described in McCloghrie, et al., RFC 1213, "Management Information Base for Network Management of TCP/IP Based Internets: MIB-II" (Internet Engineering Task Force March 1991), the contents of which are herein incorporated by reference.

The MIB at each node consists of many individual objects, each having a single value. For example, a particular node may include within its MIB an object whose value specifies the total number of IP datagrams received at that node, including those received in error. The MIB at the network management station may include an object specifying the time since the network management software at the station was last reinitialized. Each MIB includes a large number of such objects.

Each MIB object is specified by an object identifier (OID). The OID specifies the type of object and a particular instance of that type. For example, an object whose value indicates the total number of input octets on an interface of a node would be denoted by the OID 1.3.6.1.2.1.2.2.1.10.x, where x indicates a specific instance of the type identified by the values preceding x. In this case, x is just one integer and identifies a particular interface of the node storing the object referenced by the OID.

Each integer in each OID requires 4 bytes of storage. With the many OIDs that must be stored at the network management stations and other nodes of the network, there is a great requirement for memory storage space to store them. What is needed is a system for memory efficient storage of network management object identifiers such as OIDs.

SUMMARY OF THE INVENTION

Systems and methods for efficient storage of network management object identifiers are provided by virtue of the present invention. Object identifiers such as SNMP MIB object identifiers are stored in a compressed form. In one embodiment, a single integer represents multiple elements of an object identifier where these elements are common to many identifiers. The redundancy inherent in a standard object identifier format is thereby greatly reduced. Large memory savings are provided in network management systems that employ many network management objects.

According to a first aspect of the present invention, a computer-implemented method for storing a network management object identifier includes: storing a first group of elements of the identifier in compressed form, and storing the remaining elements of the identifier in uncompressed form.

According to a second aspect of the present invention, a computer-implemented method for extracting information from a network management object identifier includes steps of: extracting a first value from the identifier, decompressing the first value to form a first group of elements of the identifier, and extracting remaining elements from the identifier.

A further understanding of the nature and advantages of the inventions herein may be realized by reference to the remaining portions of the specification and the attached drawings.

DESCRIPTION OF SPECIFIC EMBODIMENTS

The present invention operates in the context of a data communication network including multiple nodes. Nodes of a network may be user workstations, servers, routers, etc. Certain nodes of the network may be network management stations used to monitor and control overall network operation.

Figure 1:
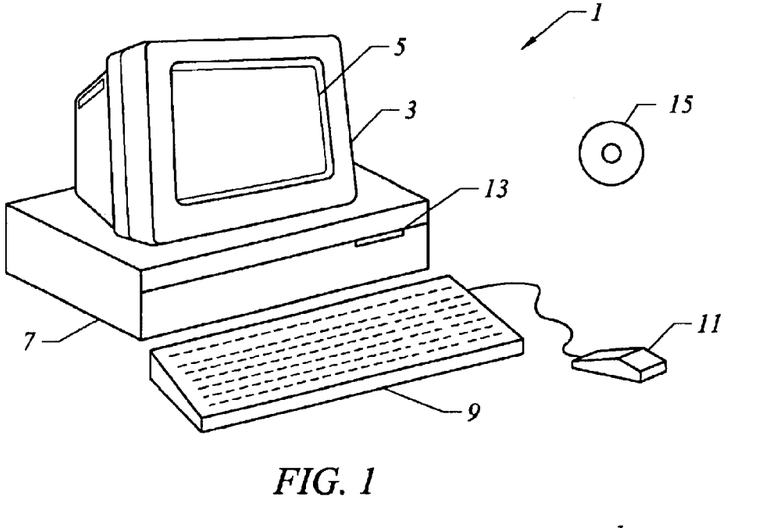
FIG. 1 depicts a computer system that may, for example, implement a network management station according to an embodiment of the present invention.

FIG. 1 illustrates an example of a computer system that can be used a network management station and execute the software of an embodiment of the invention. FIG. 1 shows a computer system 1 that includes a display 3, screen 5, cabinet 7, keyboard 9, and mouse 11. Mouse 11 can have one or more buttons for interacting with a graphical user interface. Cabinet 7 houses a CD-ROM drive 13, system memory and a hard drive (see FIG. 2) which can be utilized to store and retrieve software programs incorporating computer code that implements the invention, data for use with the invention, and the like. Although CD-ROM 15 is shown as an exemplary computer readable storage medium, other computer readable storage media including floppy disk, tape, flash memory, system memory, and hard drive can be utilized. Additionally, a data signal embodied in a carrier wave (e.g., in a network including the Internet) can be the computer readable storage medium.

Figure 2:
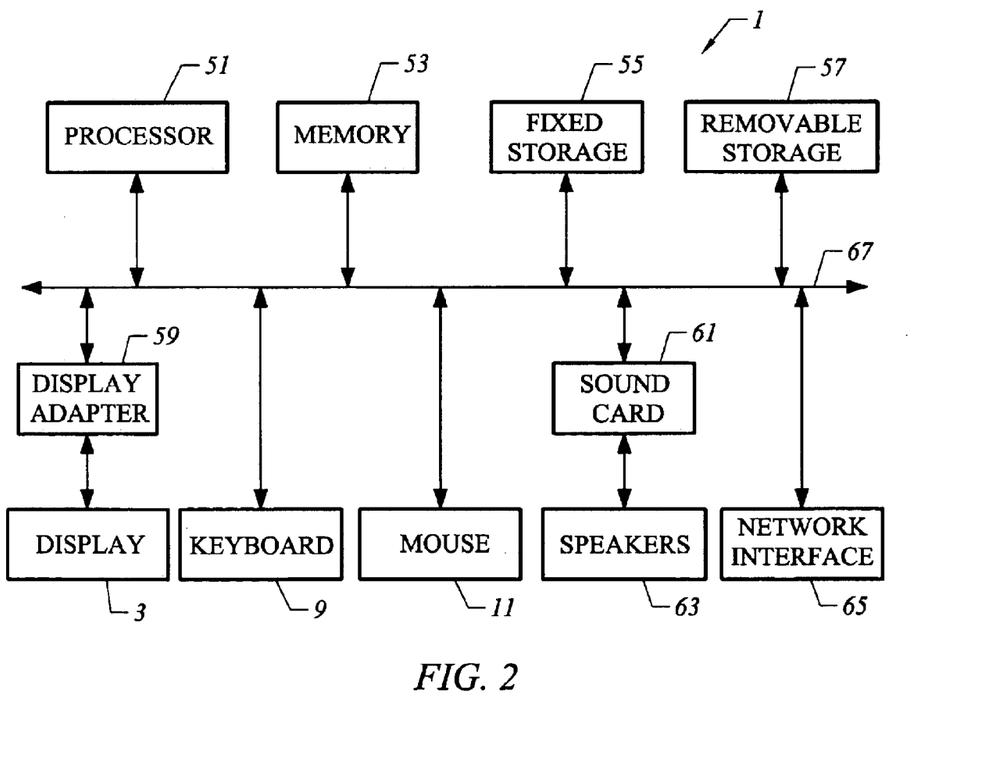
FIG. 2 depicts a system block diagram of the computer system of FIG. 1.

FIG. 2 shows a system block diagram of computer system 1 used to execute the software of an embodiment of the invention. As in FIG. 1, computer system 1 includes monitor 3, keyboard 9, and mouse 11. Computer system 1 further includes subsystems such as a central processor 51, system memory 53, fixed storage 55 (e.g., a hard drive), removable storage 57 (e.g., a CD-ROM drive), display adapter 59, sound card 61, speakers 63, and network interface 65. Other computer systems suitable for use with the invention can include additional or fewer subsystems. For example, another computer system could include more than one processor 51 (i.e., a multi-processor system) or a cache memory.

The system bus architecture of computer system 1 is represented by arrows 67. However, these arrows are illustrative of any interconnection scheme serving to link the subsystems. For example, a local bus could be utilized to connect the central processor to the system memory and display adapter. Computer system 1 shown in FIGS. 1–2 is but an example of a computer system suitable for use with the invention. Other computer architectures having different configurations of subsystems can also be utilized.

Some of the nodes in a network that employs the present invention may be network devices such as routers and switches. For example, some of the nodes may be specially configured routers such as those available from Cisco Systems, Inc. of San Jose, Calif.

A general architecture for some of these machines will appear from the description given below. In an alternative embodiment, a router or switch may be implemented on a general-purpose network host machine such as the computer system of FIGS. 1–2.

Figure 3:
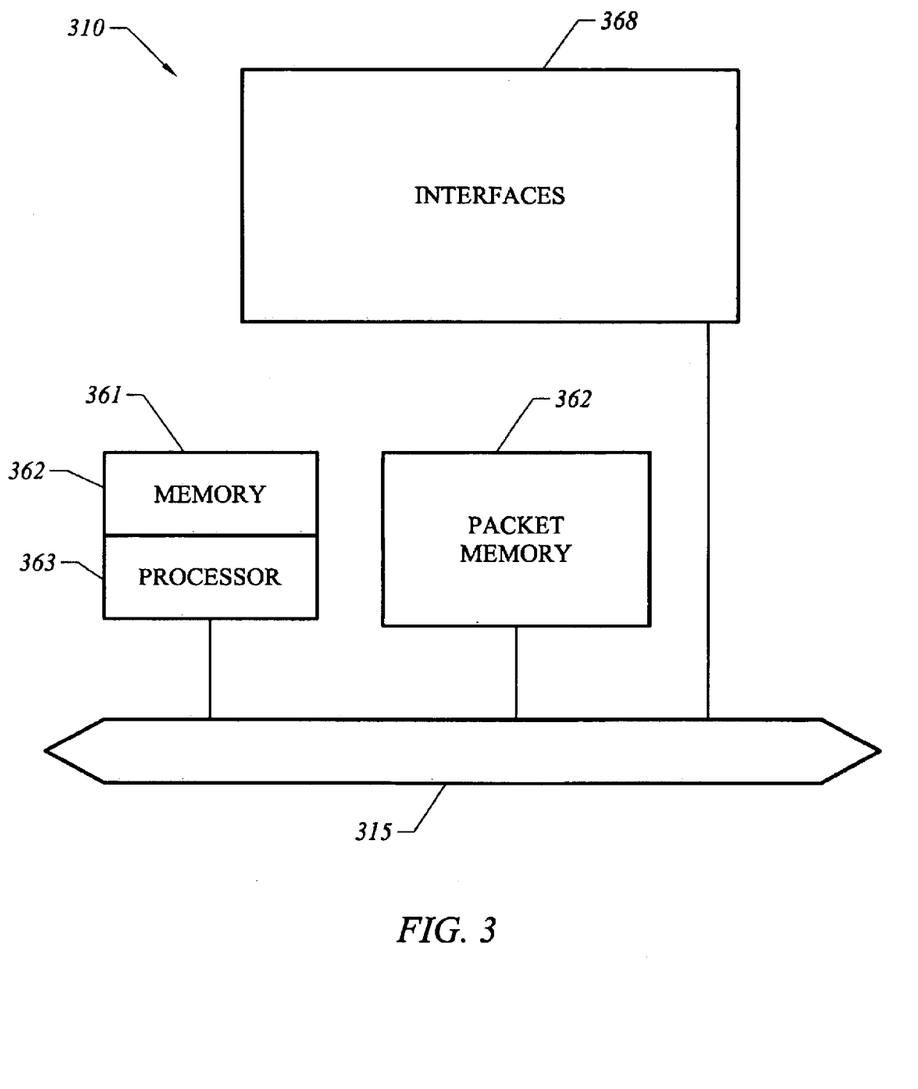
FIG. 3 depicts a router that may represent a network node according to the present invention.

Referring now to FIG. 3, a router 310 suitable for implementing the present invention includes a master central processing unit (CPU) 361, interfaces 368, and a bus 315 (e.g., a PCI bus). As shown, CPU 361 includes a memory 362 and a processor 363. When acting under the control of appropriate software or firmware, CPU 361 is responsible for such router tasks as routing table computations, network management, and general processing of packets. It preferably accomplishes all these functions under the control of software including an operating system (e.g., a version of the Internetwork Operating System (IOS®) of Cisco Systems, Inc.) and any appropriate applications software. CPU 361 may include one or more processors 363 such as a processor from the Motorola family or microprocessors of the MIPS family of microprocessors. In an alternative embodiment, processor 363 is specially designed hardware for controlling the operations of router 310. Memory 362 can be non-volatile RAM and/or ROM. However, there are many different ways in which memory could be coupled to the system.

The interfaces 368 are typically provided as interface cards (sometimes referred to as "line cards"). Generally, they control the sending and receiving of data packets over the network and sometimes support other peripherals used with the router 310. Among the interfaces that may be provided are Ethernet interfaces, frame relay interfaces, cable interfaces, DSL interfaces, token ring interfaces, and the like. In addition, various high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processor may control such communications intensive tasks as packet switching, media control, and management. By providing separate processors for the communications intensive tasks, these interfaces allow the master microprocessor 361 to efficiently perform routing computations, network diagnostics, security functions, etc. Router 310 may further include a packet memory 372 for intermediate storage of packets being forwarded by router 310.

Although the system shown in FIG. 3 is one specific router usable in connection with the present invention, it is by no means the only architecture on which the present invention can be implemented. For example, an architecture having a single processor that handles communications as well as routing computations, etc. is often used. Further, other types of interfaces and media could also be used with the router.

Regardless of a network device's configuration, it may employ one or more memories or memory modules (including memory 362) configured to store program instructions for the network management operations described herein. The program instructions may control the operation of an operating system and/or one or more applications, for example. The program instructions, operating system may be stored on, e.g., any of the media discussed in connection with the computer system of FIGS. 1–2.

Figure 4:
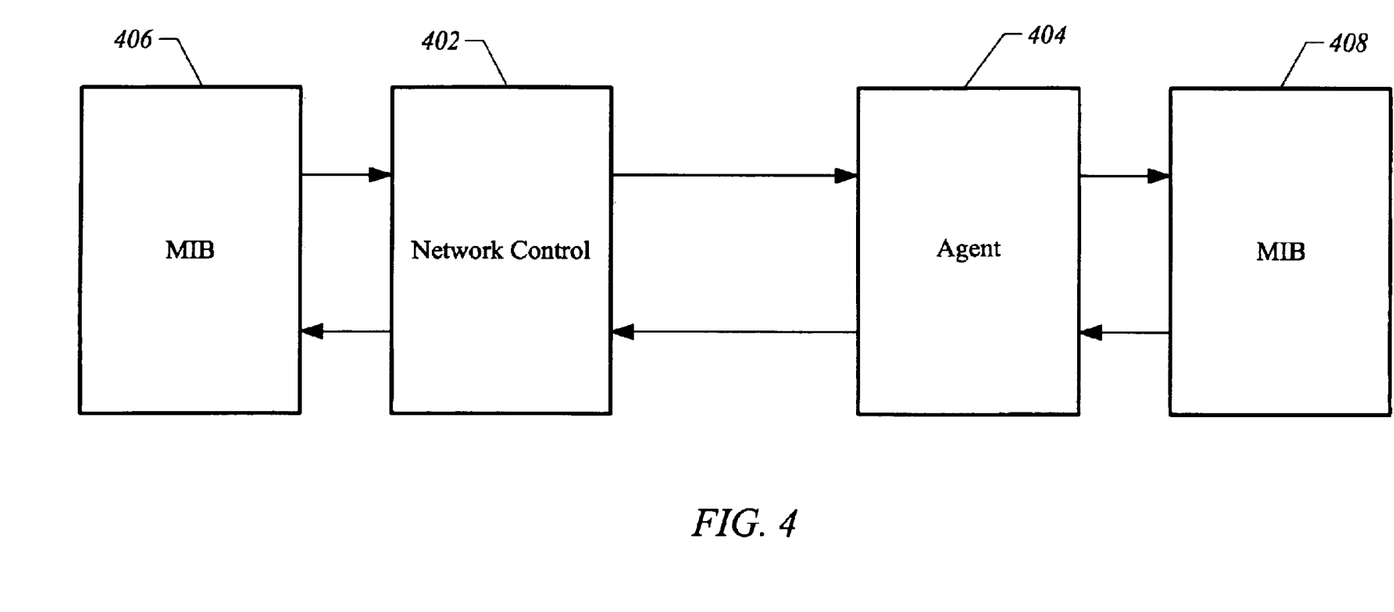
FIG. 4 depicts overall SNMP operation.

In one embodiment, the present invention operates in conjunction with SNMP which is described in Case, et al., "A Simple Network Management Protocol (SNMP)," RFC 1157, (IETF May 1990), the contents of which are herein incorporated by reference. FIG. 4 generally depicts an SNMP architecture. A network control entity 402 resides on a network management station such as computer system 1. An agent entity 404 resides on another node of the network managed by network control entity 402. For example, agent 404 may be resident on a router such as router 310. Network control entity 402 and agent entity 404 interact according to a protocol defined by SNMP. Network control entity 402 may set system parameters, e.g., TCP/IP parameters at the node occupied by agent entity 404.

There is a Management Information Base (MIB) 406 accessible to network control entity 402 to facilitate management network information. MIB 406 includes object identifiers (OIDs) that identify objects storing particular pieces of information about network operation. Each object stores a value indicative of network operation at a particular node. An MIB 408 directly accessible to agent entity 404 stores MIB objects for the node of agent entity 404. In MIB 408, each objects includes the OID and the object value.

MIB contents are described in McClogherie, et al., "Management Information Base for Network Management for TCP/IP-Based Internets: MIB-II", (IETF March 1991), the contents of which are herein incorporated by reference. Examples of MIB objects include things such as: the number of outbound packets that could not be transmitted due to errors, the length of the output packet queue, text string indicating the physical location of the node, etc. MIB 406 typically includes only the OIDs for all managed nodes. MIB 408 includes the OIDs and object values.

A typical SNMP operation involves network control entity 402 sending an SNMP message to agent entity 404 requesting a particular local parameter. Agent entity 404 then recovers this parameter by accessing a particular object in MIB 408 and responds to the request with a reply to network control entity 402 including the parameter value. Individual MIB objects are identified by the OIDs. Each OID includes a series of elements with each element being defined by an integer value. Each OID defines an object type.

Figure 5:
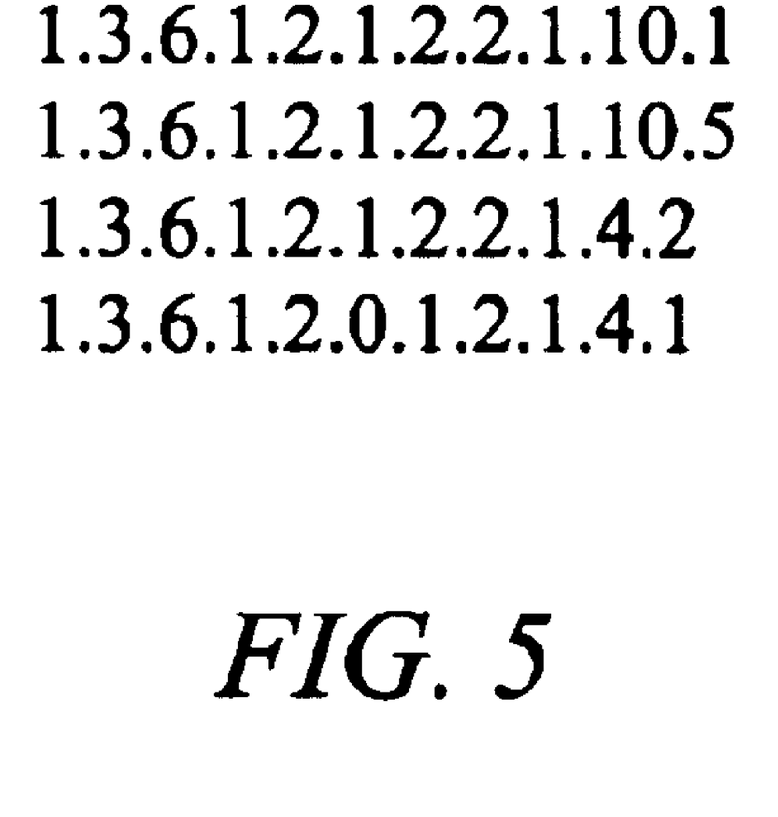
FIG. 5 depicts representative object identifiers that may be compressed according to one embodiment of the present invention.

FIG. 5 depicts four examples of OIDs. For each of the OIDs in FIG. 5, the first element has the value 1 which identifies an overall object identifier domain allocated to the ISO. The second element has the value 3 which is defined as indicating allocation toward an organization under the auspices of the ISO. The third element has the value 6 identifying the US Department of Defense (DOD) as the responsible organization. The fourth element has the value 1 identifying the Internet. Then the fifth element has the value 2 which indicates that the identifier is used for management. The remaining elements identify the particular object types with greater specificity.

Figure 6:
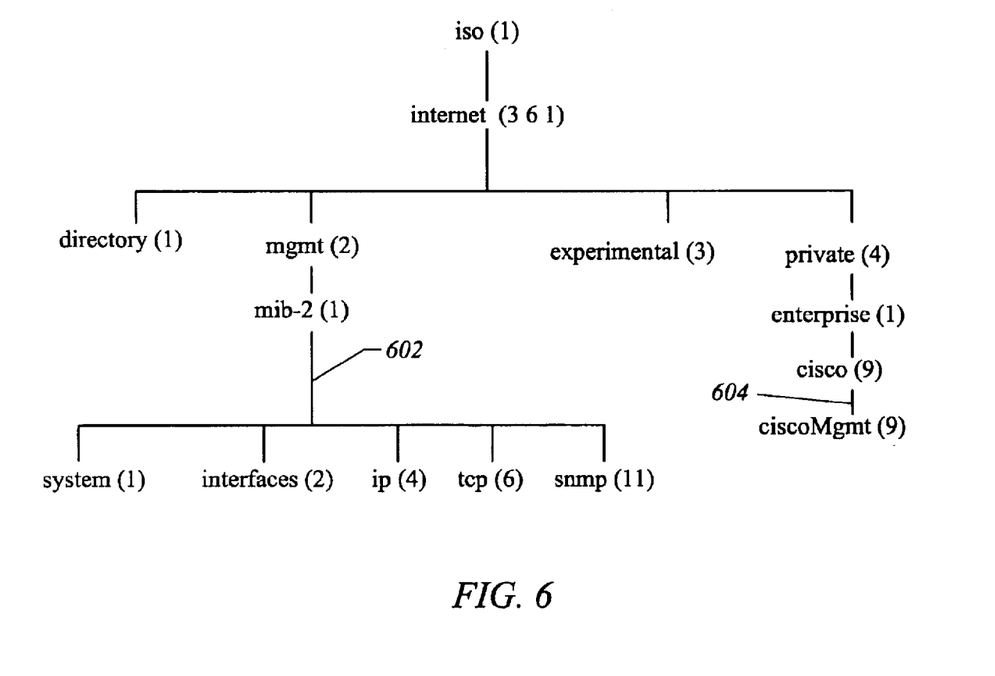
FIG. 6 depicts a portion of the tree structure for specifying MIB object identifiers.

The organization of objects within a MIB may be understood as a tree structure. An example of a portion of such a tree structure is illustrated in FIG. 6. The leaves of the tree are the individual objects. FIG. 6 shows the MIB tree from its root, "ISO", to some of its lower branches. A first branch 602 of primary interest includes the standard MIB objects defined by RFC 1213. A second branch 604 includes MIB objects defined for use by Cisco Systems. The illustration of FIG. 6 does not extend down to individual leaves but rather indicates the first series of elements in OIDs for various classes of objects. For example, OIDs from MIB objects pertaining to TCP would begin with 1.3.6.1.2.1.6.

It will be seen that accessing MIBs 406 and 408 may involve use of a large number of OIDs. These OIDs are stored at the nodes implementing both network control entity 402 and agent entity 404. Each element of each OID requires four bytes of storage, i.e., one integer space. Thus, OID storage requires a large amount of memory.

Due to the tree structure of FIG. 6, it will be seen that many OIDs start with the same elements. For example, many MIB objects defined by RFC 1213 have their OIDs begin with 1.3.6.1.2.1. Many Cisco defined MIB objects have their OIDs begin with 1.3.6.1.4.1.9. According to the present invention, a compressed representation can be formed for the first elements of OIDs. This compression recognizes that often the first OID elements will be common for a large number of MIB object types.

Figure 7:
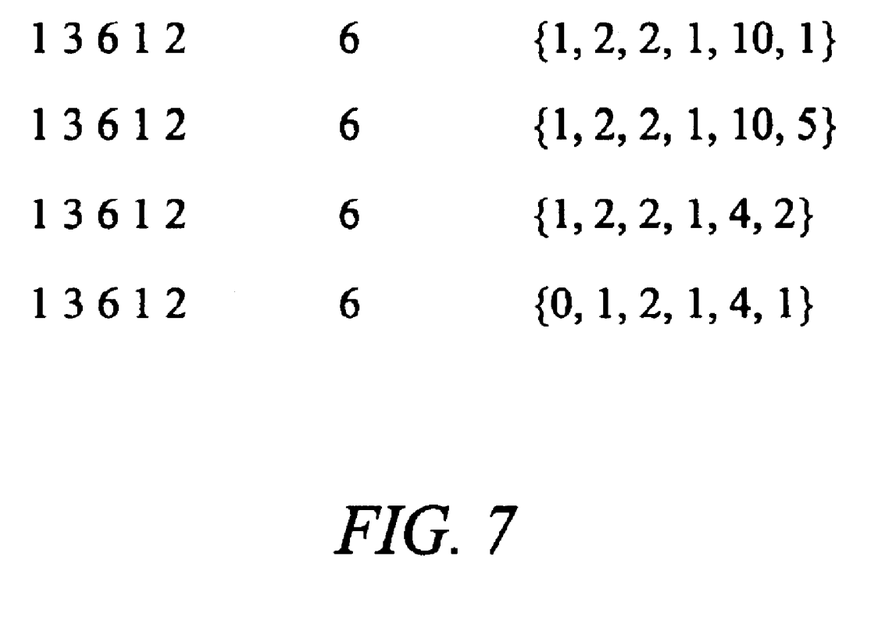
FIG. 7 depicts a compressed representation of the object identifiers of FIG. 5 according to one embodiment of the present invention.

FIG. 7 depicts exemplary compressed representations for the OIDs of FIG. 5. A single integer 13612 substitutes for the first 5 elements of the OIDs of FIG. 5. The next element 6 indicates the number of remaining elements of the OID. Then a set of four integers includes the remaining element of each OID. For example, the set {1,2,2,1,10,1} denotes the remaining six elements of the first OID of FIG. 5. In the C programming language, this representation of each OID would be as follows:

```
Typedef struct__OID {
    int initial__oid;
    in length
    unsigned long *oid__ptr;
}
```

For example,
```
{
    int 13612    -common OID portion
    int 6        -length of the remaining OID portion
    long* {1,2,2,1,10,1}
}
```

It will be seen now that in each OID depicted in FIG. 7, one integer substitutes for five integers in the uncompressed representation of FIG. 5. This results in a great saving in memory storage space occupied by OIDs.

Figure 8:
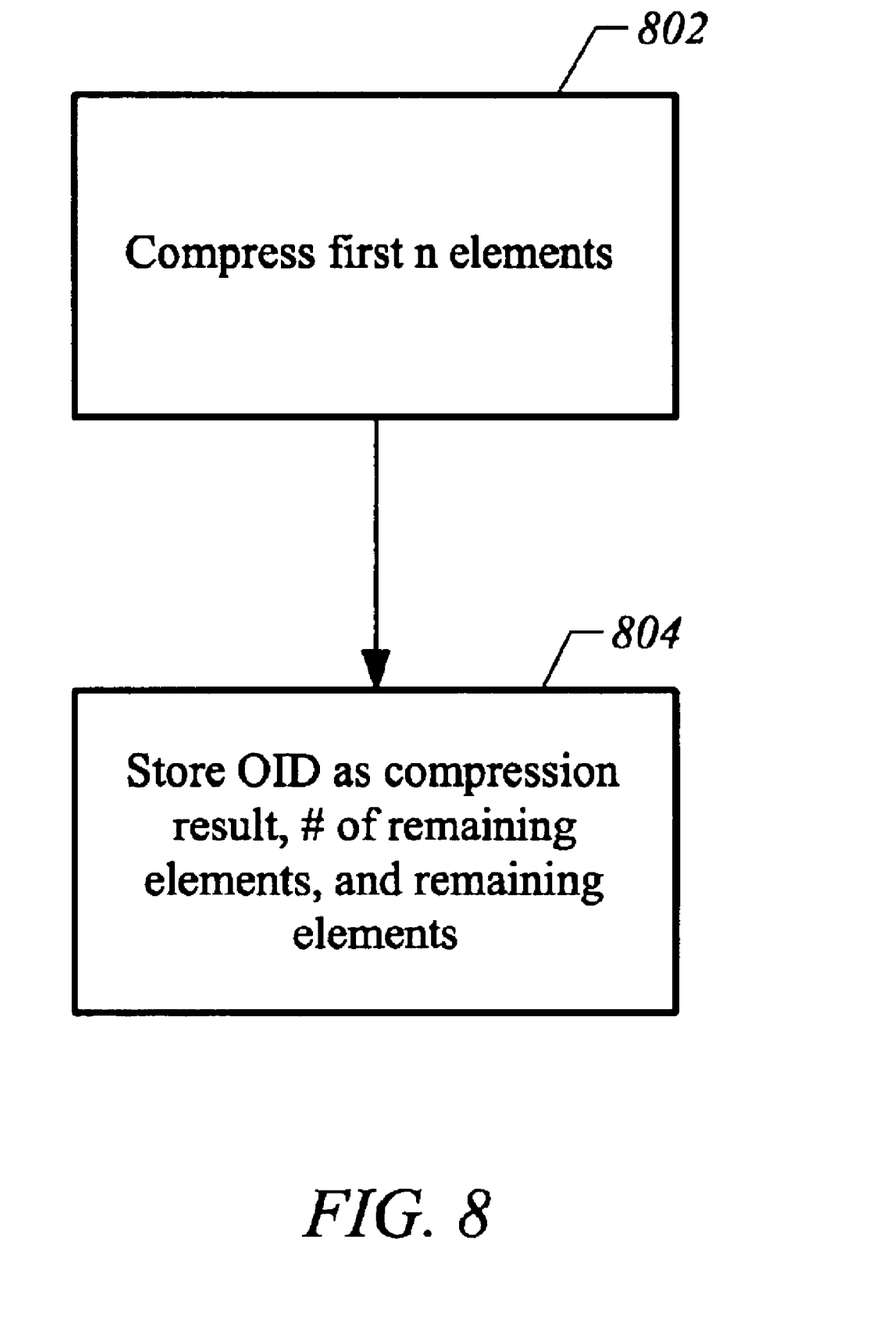
FIG. 8 is a flowchart describing steps of compressing object identifiers according to one embodiment of the present invention.

FIG. 8 describes steps of compressing OIDs according to one embodiment of the present invention. At step 802, the first n elements of the OID are compressed. They are compressed by making each element a digit of a single number with the first element being the most significant digit and the last of the n elements being the least significant digit. At step 804, the OID is stored in the data structure described above. This includes the compression result, the number of remaining elements, and a set of integers representing the remaining elements.

Figure 9:
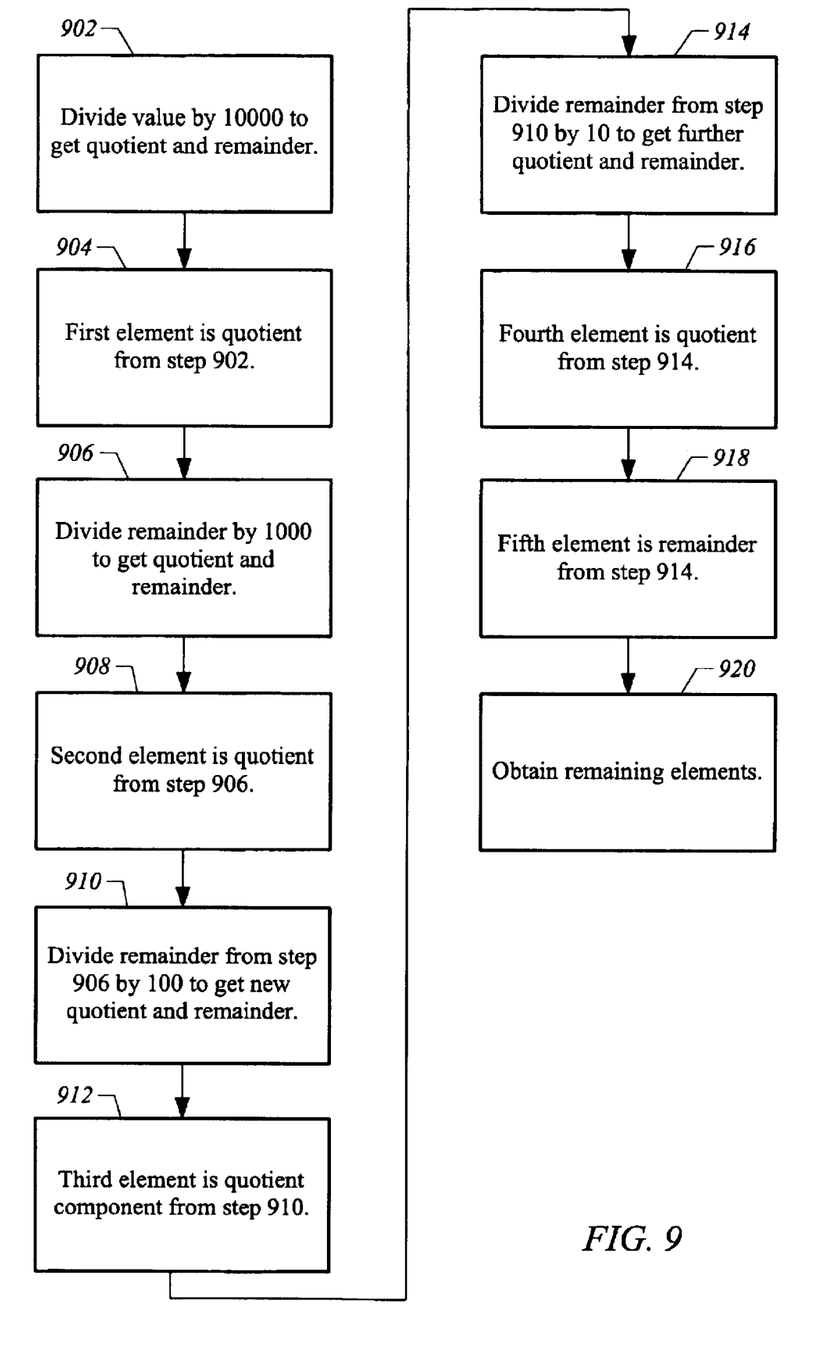
FIG. 9 is a flowchart describing steps of decompressing object identifiers according to one embodiment of the present invention.

FIG. 9 is a flow chart describing steps of decompressing OIDs that have been compressed by the technique of FIG. 8 according to one embodiment of the present invention. The steps of FIG. 9 illustrate the technique that would be used when n=5 but it will be readily apparent to modify this technique for other values of n. The compressed OID data structure is as retrieved and the compression result is extracted. At step 902, the compression result is divided by 10,000 to obtain a quotient and a remainder. At step 904, the first element of the decompressed OID is set equal to the quotient from step 902. In step 906 the remainder from step 902 is divided by 1,000 to get another quotient and another remainder. At step 908, the second element of the decompressed OID is set equal to the quotient from step 906. At step 910 the remainder from step 906 is divided by 100 to get another quotient and another remainder. At step 912 the third element of the decompressed OID is said equal to the quotient from step 910. At step 914, the remainder from step 910 is divided by 10 to get a still further quotient and remainder. At step 916, the fourth element of the decompressed OID is said equal to the quotient obtained by step 914. At step 918, the fifth element of the decompressed OID is set equal to the remainder obtained at step 914. At step 920 the remaining elements of the decompressed OID are obtained directly from the compressed OID data structure.

It will be apparent that the first n elements of an OID may be compressed so long as they are all less than 10. For all MIB objects, at least the 4 elements may be compressed. For Cisco private MIB objects, the first 6 elements may be compressed into a single integer.

All of the applications within network control entity 402 and agent entity 404 that access OIDs are modified to include the compression and decompression routines described in FIGS. 8 and 9.

It is understood that the examples and the embodiments described herein are for illustrative purposes only and that various modifications and changes in light thereof will be suggested to persons skilled in the art and are to be included within the spirit and perview of this application and scope of the appended claims and their full scope of equivalents. All publications, patents, and patent applications cited herein are hereby incorporated by reference.

What is claimed is:

1. A method for storing a network management object identifier, said method comprising:
   storing a first group of elements of said identifier in compressed form; and
   storing remaining elements of said identifier in uncompressed form, said first group of elements of said identifier in compressed form and said remaining elements of said identifier in uncompressed form together constituting a compressed network management identifier, said first group of elements and said remaining elements being associated with a single network management object.

2. The method of claim 1 wherein storing in compressed form comprises storing a single integer value representing said first group of elements, said single integer value comprising a plurality of digits, each digit representing one of said first group of elements.

3. The method of claim 1 wherein said network management object identifier comprises an SNMP MIB object identifier.

4. The method of claim 3 wherein said first group of elements have publicly designated values indicating use of an object referenced by said identifier for management.

5. A computer program product for storing a network management object identifier, said product comprising:
   code that stores a first group of elements of said identifier in compressed form;
   code that stores said first group of elements and remaining elements of said identifier, said first group of elements of said identifier in compressed form and said remaining elements of said identifier in uncompressed form together constituting a compressed network management identifier, said first group of elements and said remaining elements being associated with a single network management object; and
   a computer-readable storage medium for storing the codes.

6. The product of claim 5 wherein said code that stores in compressed form comprises code that compresses values of said first group of elements into a single integer value, said single integer value comprising a plurality of digits, each digit representing one of said first group of elements.

7. The product of claim 5 wherein said network management object identifier comprises an SNMP MIB object identifier.

8. The product of claim 7 wherein said first group of elements have publicly designated values indicating use of an object referenced by said identifier for management.

9. A computer system comprising:
   a processor that executes a program for storing a network management object identifier, said program comprising:
      code that compresses a first group of elements of said identifier; and
      code that stores said first group of elements and remaining elements of said identifier, said first group of elements of said identifier in compressed form and said remaining elements of said identifier in uncompressed form together constituting a compressed network management identifier, said first group of elements and said remaining elements being associated with a single network management object; and
   a computer-readable storage medium having said program stored thereon.

10. Apparatus for storing a network management object identifier, said apparatus comprising:
    means for storing a first group of elements of said identifier in compressed form; and
    means for storing remaining elements of said identifier in uncompressed form, said first group of elements of said identifier in compressed form and said remaining elements of said identifier in uncompressed form together constituting a compressed network management identifier, said first group of elements and said remaining elements being associated with a single network management object.

11. The apparatus of claim 10 wherein said means for storing in compressed form comprises means for storing a single integer value representing said first group of elements, said single integer value comprising a plurality of digits, each digit representing one of said first group of elements.

12. The apparatus of claim 10 wherein said network management object identifier comprises an SNMP MIB object identifier.

13. The apparatus of claim 10 wherein said first group of elements have publicly designated values indicating use of an object referenced by said identifier for management.

* * * * *